A. C. LINDHOLM.
WORK HOLDER.
APPLICATION FILED JUNE 24, 1920.

1,376,953.  Patented May 3, 1921.

WITNESS:  INVENTOR.
A. C. Fairbanks  Arthur C. Lindholm,
BY
Frank A. Cutter,
ATTORNEY.

UNITED STATES PATENT OFFICE.

ARTHUR C. LINDHOLM, OF SPRINGFIELD, MASSACHUSETTS.

WORK-HOLDER.

1,376,953.  Specification of Letters Patent.  Patented May 3, 1921.

Application filed June 24, 1920. Serial No. 391,377.

*To all whom it may concern:*

Be it known that I, ARTHUR C. LINDHOLM, a citizen of the United States of America, and a resident of Springfield, in the county of Hampden and State of Massachusetts, have invented a new and useful Work-Holder, of which the following is a specification.

My invention relates to improvements in work-holding, indexing, or positioning means for machines for grinding cutters and the like, and consists of a blade which is designed to engage the cutter being ground, and certain peculiar supporting and adjusting members, for said blade, such members being mounted on the bearing of the grinding machine for the chuck, in which is inserted the spindle of the cutter being ground, all as hereinafter set forth.

The primary object of my invention is to provide, for a grinding machine, a work holder or indexing device which is capable of accurately controlling the cutter while being ground, so that all of the teeth of said cutter shall receive uniform treatment.

This work holder is comparatively simple and inexpensive in construction, can readily be placed in position on the machine and removed from such position, and is adapted to be easily and quickly adjusted to cutters of different sizes, and in such a manner as to insure the accurate grinding of the cutter teeth.

Other objects and advantages will appear in the course of the following description.

I attain the objects and secure the advantages of my invention by the means illustrated in the accompanying drawings, in which—

Figure 1:
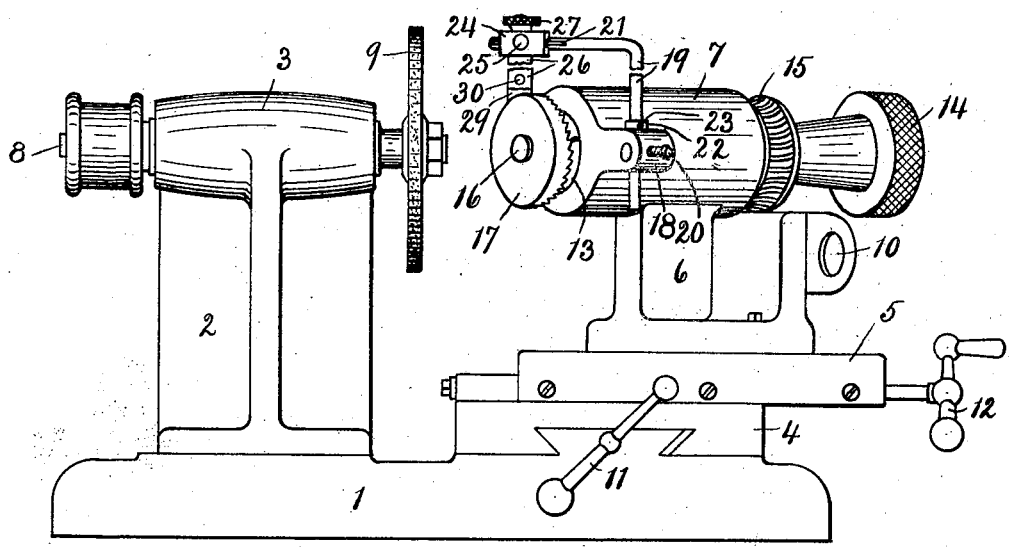
Figures 2, 3, 4:
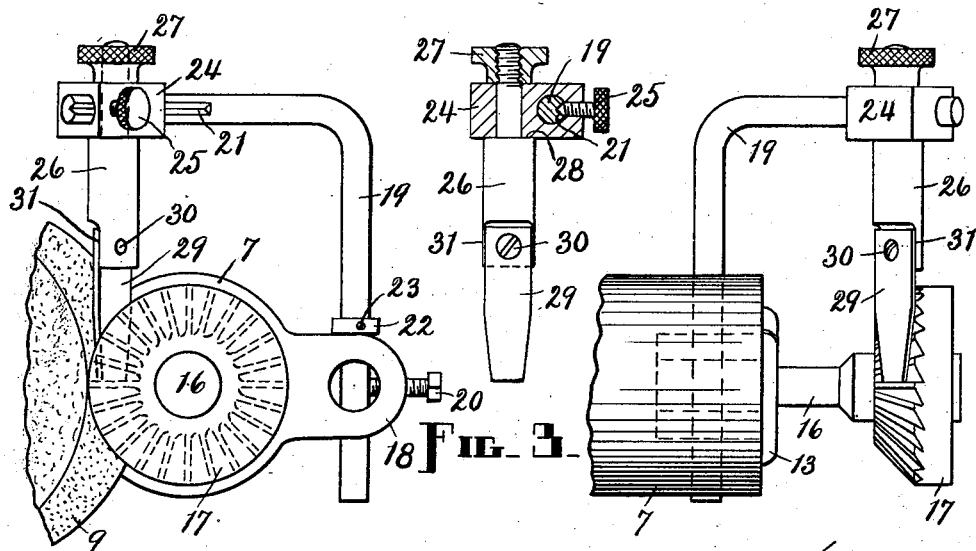

Figure 1 is a front elevation of a grinder or grinding machine having my work holder connected therewith; Fig. 2, an enlarged, forward end elevation of the chuck bearing of said machine and a cutter supported therefrom, with the indexing device in operative position on said bearing and relative to said cutter, the parts corresponding with those shown in the first view in which said cutter also appears; Fig. 3, an enlarged detail in partial section of said indexing device, and, Fig. 4, a backside elevation of the parts and members shown in Fig. 2, except that the portion of the grinding-wheel which appears therein is omitted from the last view.

Similar reference characters refer to similar parts throughout the several views.

Referring first to Fig. 1, it will be observed that I have shown therein the following parts and members of a grinder: A bed-plate 1, a vertical support 2 mounted on said bed-plate and having a top bearing 3, said bearing being parallel with the front edge of the bed-plate, a bottom carriage 4 arranged to slide back and forth on said bed-plate, an upper carriage 5 arranged to reciprocate transversely on said first-named carriage, an upright 6 having its base mounted on said upper carriage and adapted to be rotatively adjusted thereon, a bearing 7 at the upper end of said last-named upright, a shaft 8 journaled in said bearing 3 and driven in any suitable manner, a grinding-wheel 9 secured on said shaft at the right-hand end thereof, a worm-shaft 10 journaled in said upright 6, operating handles 11 and 12 for said carriages, respectively, a chuck 13 mounted in said bearing 7, a hand-wheel 14 by means of which said chuck is operated to open and close the same, and a worm-wheel 15 for rotating said chuck, said worm-wheel being driven by a worm on said worm-shaft, and the latter being driven in any suitable manner. This grinder is similar to that for which I have an application for Letters Patent of the United States, said application being serially numbered 314,495, and operates in the manner set forth in said application.

A spindle 17 is represented as being in the grasp of the chuck 13, in Figs. 1, 2, and 4, and there is a cutter 17 on the outer end of the said spindle.

When a cutter is to be ground the chuck 13 is not revolved through the medium of the worm-wheel 15 and the driving members therefor, but it is rotated by hand in the manner hereinafter described.

The axes of the grinding-wheel 9 and the chuck 13 are in the same horizontal plane. Consequently when the work is brought into contact with the grinding-wheel 9, the latter operates on said work at the rear end of the horizontal diameter of the same. The upright 6 is adjusted about its center on the carriage 5 so as to position the work in such a manner that the surface or part to be ground is at exactly the proper angle to the periphery of the grinding-wheel 9.

A lug 18 projects laterally from the bearing 7 adjacent to the forward end thereof, and said lug is perforated to receive the vertical part of an angular rod 19, and is provided with a set-screw or bolt 20 to engage and release said rod for the purpose of adjusting the same vertically or rotatably, or both. The bolt 20 is tapped into the outer end of the lug 18. The horizontal part of the rod 19 extends forwardly and obliquely over the tops of the bearing 7, the exposed portion of the chuck 13, the spindle 16, and the cutter 17. A V-shaped, longitudinal slot or groove 21 is made in one side of the aforesaid horizontal part of the rod 19 adjacent to and opening through the free end of said part. Mounted on the vertical part of the rod 19, above the lug 18, is a collar 22 which is secured to said part of said rod by means of a set-screw 23. This collar rests on the top of the lug 18 and assists the bolt 20 in supporting the rod in said lug.

A head-block 24 is mounted on the horizontal part of the rod 19, and a set-screw 25 is tapped into and through the side of said block which is adjacent to the groove 21. The inner end of the set-screw 25 is conical so as to enable the same to fit the groove 21. By means of this set-screw the head-block 24 can be secured to the horizontal part of the rod 19 after longitudinal adjustment on said rod. The set-screw 25 also, by reason of its engagement with the groove 21, prevents the head-block 24 from rotating on its supporting rod. A vertical shank 26 has its upper end thrust through an opening in the head-block 24 behind the horizontal part of the rod 19, and is securely attached to said block by means of a set-nut 27 which is threaded to the protruding upper terminal of said shank. The shank 26 is provided with a shoulder 28 between which and the set-nut 27 the head-block 24 is tightly grasped when said nut is screwed down on to said block. Upon loosening the set-nut 27 the shank 26 can be rotatively adjusted.

The shank 26 is provided at the bottom with an indexing finger 29. This finger is preferably detachable, so that it can be replaced when worn out or mutilated, and to this end a screw 30 is employed. The screw 30 passes through the upper portion of the finger 29 and is tapped into the lower portion of the shank 26, such lower portion being flattened to afford a good bearing for said finger, which latter is a flat member. The finger 29 is quite thin and should be more or less resilient.

The construction and arrangement of the parts just described are such that the indexing finger or blade 29 can be positioned with its bottom edge in the same horizontal plane with that of the axes of the grinding-wheel 9 and the chuck 13 or cutter 17, and at the rear end of the horizontal diameter of said cutter. In practice, however, the aforesaid bottom edge should be positioned slightly above the aforesaid horizontal plane, the distance above said plane being approximately equal to the width of the ground portion of each of the cutter teeth. By this is meant the portion ground by the grinding-wheel 9. Otherwise the blade 29 would hold the cutter 17 in such a position that the tooth being ground would be too low, and the desired effect would be defeated.

After placing the cutter 17 in position and making any necessary adjustments of the movable members of the grinder to insure the proper grinding of the teeth of said cutter, it is necessary to adjust the work holder to the cutter. To do this the rod 19 is adjusted vertically and rotatively in the lug 18 to the required extent and then secured by means of the bolt 20, and the collar 22 and set-screw 23; then the head-block 24 is adjusted on the horizontal part of said rod and secured by means of the set-screw 25; and, finally, the shank 26 with the finger 29 is adjusted and secured by means of the set-nut 27. These adjustments may not all be required, and they need not necessarily be made in the order just named. The bottom edge of the finger 29 is now located in position to engage or be engaged by the back edge, in the direction of rotation of the cutter 17 in grinding, of each tooth of said cutter, when such edge is slightly above the horizontal, diametrical plane of the cutter, and behind the axis of the cutter. Thus located the finger 29 is engaged by the cutter teeth successively. The cutter is held with the tooth being ground against the bottom edge of the finger, by hand, during the grinding operation. After each tooth is ground and the cutter is retracted from the grinding field, said cutter is rotated by hand from right to left, the distance between two of its teeth, to present the next tooth for grinding. As the cutter is rotated the finger 29 snaps out of engagement with the first tooth with which it was engaged and into engagement with the second or following tooth. The latter now engages the finger 29 and the cutter is held against rotation while actuated into contact again with the grinding-wheel for the purpose of having another tooth ground, and during the grinding operation, as before. These indexing and grinding operations are repeated until all of the teeth have been ground.

The finger 29 must be sufficiently resilient to enable it to yield for the passage past its bottom edge of each tooth after being ground, and thin enough to engage and assist in holding the tooth during the grinding operation, without being in the way of the grinding-wheel 9. The finger 29 is readily adjusted and set in proper relation to the teeth of this or any cutter by means of the threaded members and the collar 22.

The adjusting means herein provided enables the finger to be placed at any distance from the vertical part of the rod 19, within the length of the horizontal part of said rod, and at different angles, and the elevation of said finger also can be varied if desired, although it will seldom be necessary to vary such elevation, and any such variation would be slight.

Inasmuch as the finger 29 will receive more or less abrasion from the grinding-wheel 9, it in time becomes worn to such an extent as to impair its usefulness. Whenever this occurs the screw 30 is removed, the old finger is replaced with a new one, and the latter is secured to the shank 26 by means of said screw. This detachable feature is an important advantage as will readily be seen.

The handles 11 and 12 are the mediums by means of which the two-way movement, needed for the grinding operation, is imparted to the upright 6 and the parts and members supported thereon and thereby. In the first view the cutter 17 is out of grinding position, but the parts and members are in readiness to actuate said cutter into such position or into contact with the grinding-wheel 9; while in Fig. 2 said cutter is represented as being in contact with said grinding-wheel.

That portion of the shank 26 which is flattened to receive and afford a good bearing for the upper terminal portion of the finger 29 is represented at 31.

In the event it be not desired to use the work holder, as when the grinder is employed for dressing valves, said holder can be readily removed upon loosening the bolt 20, the rod 19 being then withdrawn upwardly from the lug 18. When the work holder is again attached to the grinder by inserting the bottom terminal of the rod 19 in the lug 18, the collar 22 acts as a stop and determines the elevation of the finger 29 and the other members, since said rod can be thrust downwardly only as far as is permitted by the contact of said collar with said lug.

More or less change in the shape, size, construction, and arrangement of some or all of the parts of the present embodiment of my invention may be made without departing from the spirit thereof or exceeding the scope of what is claimed.

What I claim as my invention, and desire to secure by Letters Patent, is—

1. The combination, in a work holder, with a chuck and bearing therefor, of a rod comprising vertical and horizontal parts, the vertical part of said rod being supported by said bearing and vertically adjustable therein, a head-block adjustably supported by the horizontal part of said rod, a shank adjustably supported by said head-block, means rigidly to connect each of the aforesaid adjustable parts or members to the supporting part or member therefor, and a resilient finger detachably connected with said shank and when attached thereto adapted to be engaged by the teeth of a cutter carried by said chuck.

2. The combination, in a work holder, with a chuck and bearing therefor, of a rod comprising vertical and horizontal parts, the vertical part of said rod being supported by and rigidly connected with said bearing, and the horizontal part of said rod having a groove therein, a head-block mounted on said horizontal part and provided with a threaded member to engage the grooved portion of said horizontal part, a shank supported by and rigidly connected with said head-block, and a resilient finger connected with said shank and adapted to be engaged by the teeth of a cutter carried by said chuck.

3. The combination, in a work holder, with a chuck and bearing therefor, of a rod supported by and rigidly connected with said bearing, a head-block supported by and rigidly connected with said rod, a shouldered shank having its upper terminal inserted in said head-block, a threaded member on said terminal above said head-block, and a finger connected with said shank at the bottom and adapted to be engaged by the teeth of a cutter carried by said chuck, said finger being resilient.

4. The combination, in a work holder, with a chuck and bearing therefor, said bearing having a lug, of a rod comprising vertical and horizontal parts, the vertical part of said rod being received in said lug, means to secure said vertical part to said lug, and the horizontal part of said rod having a longitudinal groove therein, a head-block mounted on the horizontal part of said rod and provided with a threaded member to enter said groove, whereby said horizontal part and said head-block are secured together and prevented from rotating the one relative to the other, a shouldered shank having a part inserted in said head-block, a threaded member on said inserted part above said head-block, said last-named member being adapted to force the shouldered part of said shank against the head-block, a resilient finger, and detachable means to secure said finger to said shank, the latter being flattened at its lower terminal to accommodate said finger, which finger is adapted to be engaged by the teeth of a cutter carried by said chuck.

ARTHUR C. LINDHOLM.

Witnesses:
F. A. CUTTER,
ARTHUR A. BETH.